Patented Oct. 31, 1922.                                      1,433,813

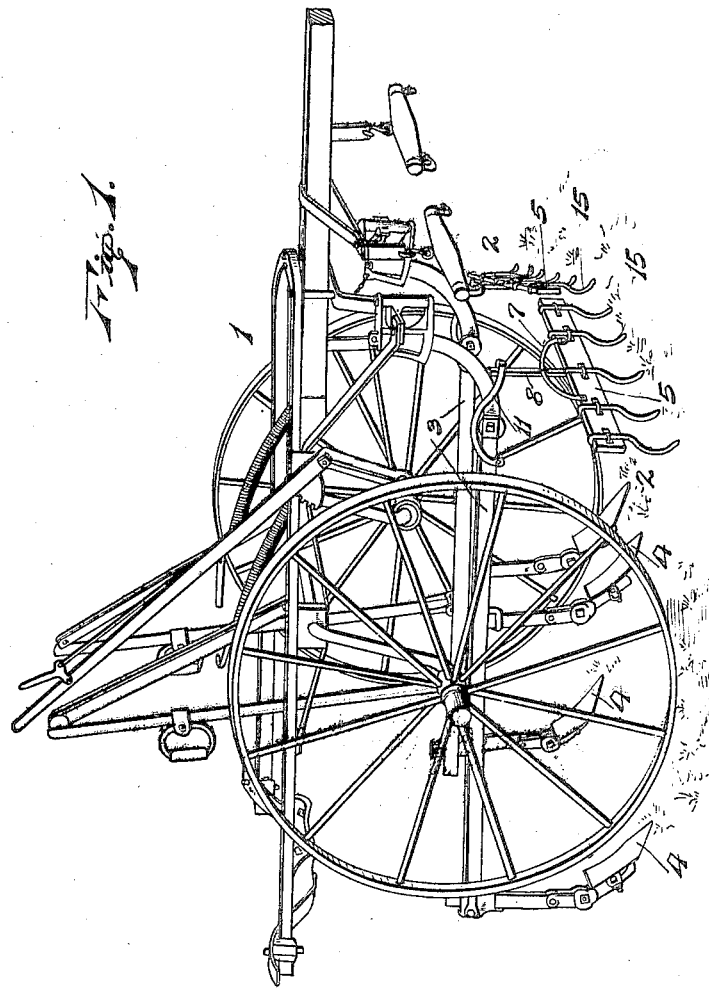

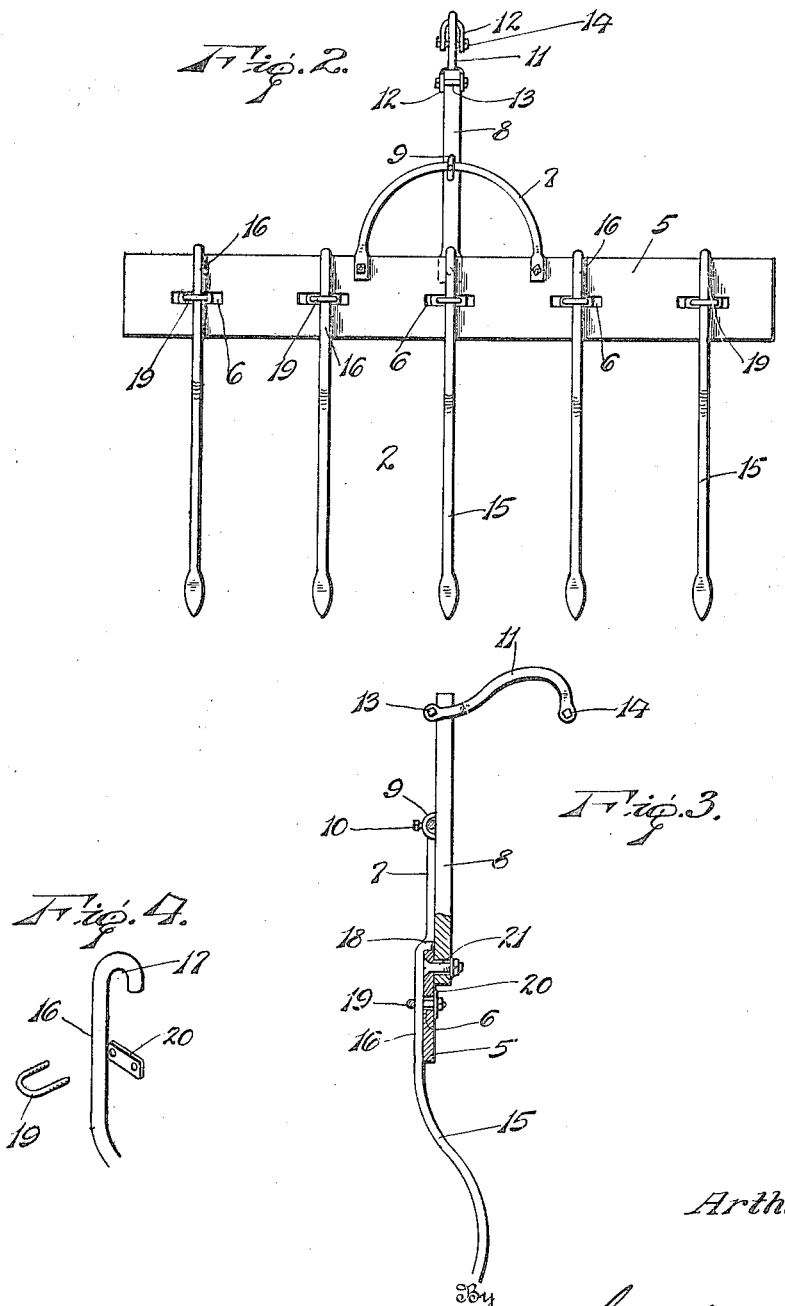

UNITED STATES PATENT OFFICE.

ARTHUR GOODE, OF SAN SABA, TEXAS.

HARROW ATTACHMENT FOR CULTIVATORS.

Application filed June 13, 1921.  Serial No. 477,124.

*To all whom it may concern:*

Be it known that I, ARTHUR GOODE, a citizen of the United States, residing at San Saba, in the county of San Saba and State of Texas, have invented certain new and useful Improvements in Harrow Attachments for Cultivators, of which the following is a specification.

This invention relates to agricultural implements and has for its object the provision of an attachment for cultivators by the use of which the surface soil may be thoroughly pulverized and reduced to a fine mulch and whereby all weeds, leaves or other trash may be removed from the rows of growing plants or from the lines in which seed is to be planted. The invention seeks to provide an attachment for cultivators which may be readily adjusted to any desired angle in both vertical and horizontal planes and which may be readily removed from or applied to a cultivator frame. Other incidental objects of the invention will appear in the course of the following description and the invention resides in certain novel features which will be particularly pointed out in the appended claims.

In the accompanying drawings—

Figure 1 is a perspective view of a cultivator having my improved harrow attachment applied thereto;

Fig. 2 is an enlarged front elevation of the attachment;

Fig. 3 is a view, partly in end elevation and partly in vertical section, of the harrow attachment;

Fig. 4 is a detail perspective view showing the means whereby the harrow teeth are secured in position.

The cultivator 1 may be of any well-known or preferred type and my invention contemplates the provision of a harrow attachment 2 to each cultivator beam 3 adjacent the front end of the beam. The cultivator shovels 4 may be omitted and the attachment used solely for harrowing when desired. In carrying out the invention, I employ a harrow beam or bar 5 which is preferably a flat bar provided with a plurality of longitudinal slots 6 and to the upper edge of the said bar, at the center thereof, I secure an arched or curved hanger or bracket 7. At the center of the said bar, I secure for pivotal movement a post 8 which extends upwardly past the bracket 7 and carries an eye 9 through which the intermediate portion of said bracket passes, a set screw 10 being mounted in the eye to bear upon the bracket and thereby secure the same in any set position relative to the post. The upper end of the post 8 is shown engaged by one end of a link or coupling 11 which is of an ogee form so that it may be used in connection with cultivator beams of various styles. The coupling link is constructed with forked ends, as shown at 12 in Fig. 2, and one of said ends embraces the upper extremity of the post 8 and is secured thereto by a clamping bolt 13 inserted through the ends of the fork. In the illustrated arrangement, the coupling is attached to the cultivator beam 3 by having the fork 12 remote from the post fitted over the cultivator beam and clamped thereto by a bolt 14. It may sometimes, however, be impractical to connect the post to the beam in the described manner and the desired connection may then be effected by an eye bolt engaged around the post and clamped to the beam or by any other convenient or preferred connection.

The harrow teeth 15 are preferably of the spring tooth type and are constructed with straight upper shanks 16 adapted to fit close against the front side of the harrow bar 5 and at their extremities are constructed with hooks 17 which are adapted to engage over the upper edge of the bar and thereby aid in retaining the harrows in engagement with the bar. The central harrow tooth will obviously be disposed in juxta-position to the post 8 and this tooth will, therefore, have its upper end provided merely with a lug 18 which bears upon the upper edge of the harrow bar. Clips or U-bolts 19 are fitted around the shanks of the harrow teeth and through the slots 6 of the harrow bar and are secured in position by nuts mounted upon their extremities and turned home against washers or plates 20 fitted against the rear side of the harrow bar and bridging the slots 6 through which the respective clips pass. When the nuts are turned home, the clips will be drawn closely around the shanks of the harrow teeth and the said shanks will thereby be firmly clamped against the harrow bar, as will be readily understood on reference to Fig. 3.

The harrow bars are illustrated in Fig. 1 as diverging from the central longitudinal line of the cultivator, but it will be understood that they may be set to converge toward said line by loosening the bolts 13 and then turning the posts 8 about their own longitudinal axes, after which the bolts 13 are again tightened. It is also possible to set either end of either harrow bar above or below the opposite end of the bar by loosening the set screw 10 and then shifting the bar relative to the post 8 pivotally about the bolt 21 which attaches the bar to the post. After the desired inclination of the harrow bar has been attained, the set screw 10 is turned home so as to secure the parts in the position to which they have been adjusted.

As the machine is drawn over a field, the harrow teeth will push aside all large stones, trash, or other obstacles, and will serve to break up clods and thoroughly pulverize the soil so that the desired mulch will be produced. The cultivator shovels following in the paths of the respective harrows will turn the pulverized soil over onto the seed or around the stems of young plants so that they will be protected and growth promoted. The attachment is very simple in the construction and arrangement of its parts and may be produced and applied to any cultivator at a low cost. In operation it will be found highly efficient for the purposes for which it is designed. Obviously, the harrow teeth may be set closer together or farther apart by adjusting them from end to end of the respective slots 6 in the harrow bar and the construction of the upper extremities of the shanks of the harrow teeth will tend to prevent dropping of the teeth even if the clip bolts by which they are held to the harrow bar should become loosened.

Having thus described the invention, what is claimed as new is:

1. A harrow attachment for cultivators comprising a harrow bar, harrow teeth carried by said bar, a post pivotally connected at its lower end to the harrow bar at the center thereof, means for connecting said post to a cultivator beam, and a bracket secured at its ends to the harrow bar and at opposite sides of said post and adjustably secured between its ends to the post.

2. A harrow attachment for cultivators comprising a harrow bar, harrow teeth carried by said bar, a post rising from said bar, and an ogee coupling link provided at its ends with forks, one of said forks being adapted to embrace and be secured to the post and the other of said forks being adapted to embrace and be secured to a cultivator beam.

In testimony whereof I affix my signature.

ARTHUR GOODE. [L. S.]